United States Patent [19]

Ueda et al.

[11] Patent Number: 4,530,580
[45] Date of Patent: Jul. 23, 1985

[54] TELESCOPIC EXTENDER FOR SUPPORTING COMPACT CAMERA

[76] Inventors: Hiroshi Ueda, 1-2-2, Nogami-Cho, Saidaiji, Nara-Shi, Nara-Ken; Yujiro Mima, 3-4-3, Nakamachi, Asahigaoka, Sakai-Shi, Osaka-Fu, both of Japan

[21] Appl. No.: 571,603

[22] Filed: Jan. 17, 1984

[30] Foreign Application Priority Data

Jan. 18, 1983 [JP] Japan ................ 58-5654[U]

[51] Int. Cl.³ ............................................. G03B 17/56
[52] U.S. Cl. ...................................... 354/82; 354/293; 248/187
[58] Field of Search ........................... 354/81, 82, 293; 352/243; 248/187, 188.5

[56] References Cited

U.S. PATENT DOCUMENTS

| | | | |
|---|---|---|---|
| 2,239,201 | 4/1941 | Pyzel | 354/81 |
| 2,703,691 | 3/1955 | Minnis | 354/293 |
| 2,771,826 | 11/1956 | Shapiro | 354/82 |
| 4,437,753 | 3/1984 | Dunn | 354/82 |

FOREIGN PATENT DOCUMENTS 51-36524 9/1976 Japan .
55-142796 10/1980 Japan .
57-199326 12/1982 Japan .

*Primary Examiner*—A. A. Mathews
*Attorney, Agent, or Firm*—Wolder, Gross & Yavner

[57] ABSTRACT

A telescopic extender for supporting a compact camera includes a head member to be attached to the camera, a grip to be held and a telescopic rod member connecting the head member to the grip. A screw member is supported by the head member in a manner that the screw member is rotatable about the axis perpendicular to an extending and collapsing direction of the telescopic rod. The grip can accomodate therein the telescopic rod when the telescopic rod is completely collapsed.

11 Claims, 24 Drawing Figures

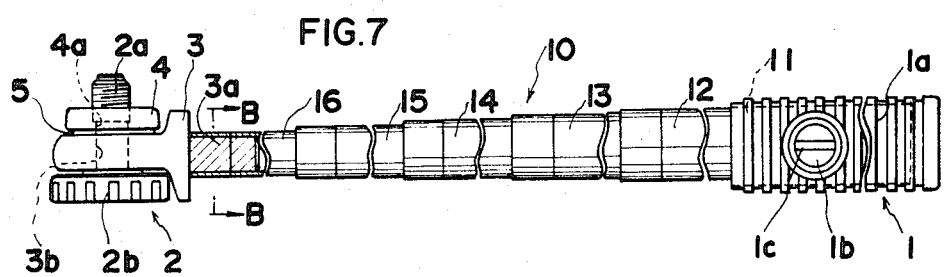
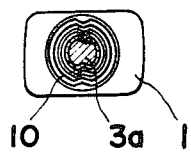
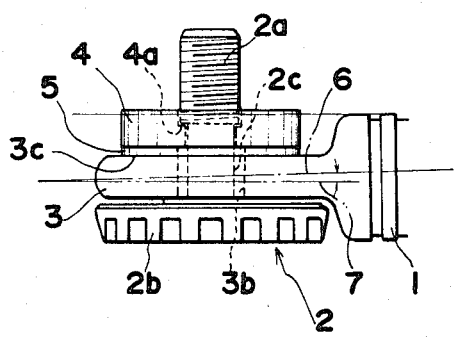
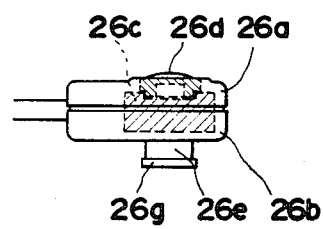
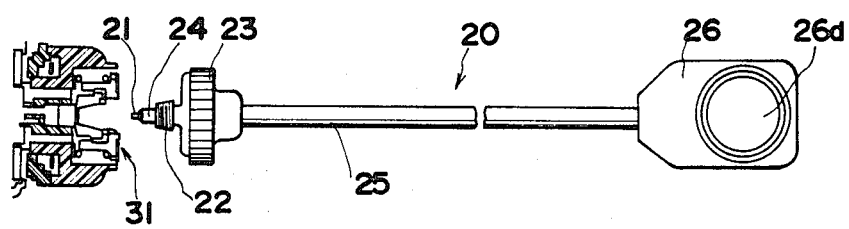
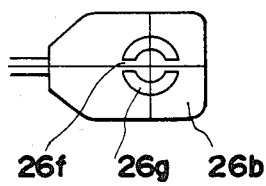
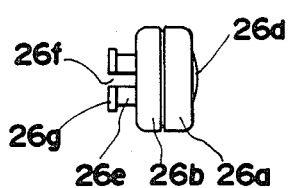

TELESCOPIC EXTENDER FOR SUPPORTING COMPACT CAMERA

BACKGROUND OF THE INVENTION

1. Field of the Invention

The present invention relates to an extendable supporting device for a camera, and especially to such a supporting device suitable for use with a compact camera.

2. Description of the Prior Art

In case a person wishes to photograph him- or herself, it is very common to use a tripod as a support, set a camera on the tripod and operate the camera by means of a self-timer. However, tripods are generally heavy in weight and cumbersome so that they are not ordinarily carried with a camera.

Especially, in the case where the photographer uses a compact camera for use with a disk type film or an 110 size film contained in a film cartridge (such as manufactured by Eastman Kodak Co.), the tripod will be considerably bulky in comparison with the size of the camera. Accordingly, to carry a tripod with such a camera will obstruct the user from enjoying the full advantage of the compact camera, i.e. convenience of carrying and it is less likely that a tripod is carried with such a compact camera.

In the case the user wishes to photograph him- or herself without a tripod, he or she may do so by holding the camera as shown in FIG. 1 but this way is disadvantageous in that only close up photography is possible because the camera can not be held away from the user to be photographed, beyond the length of the user's arm.

SUMMARY OF INVENTION

An object of the present invention is to provide a novel camera supporting device to be used for self-photography.

Another object of the present invention is to provide such a camera supporting device which is so compact as not to obstruct the convenience of carrying even when it is attached to a compact camera.

A further object of the present invention is to provide such a camera supporting device that can be easily handled.

BRIEF DESCRIPTION OF THE DRAWING

FIG. 7 is a partially cut away front elevational view of the first embodiment in an expanded state;

FIG. 8 is a cross sectional view of taken along line B—B in FIG. 7;

FIG. 9 is a fragmental front view of the first embodiment;

FIG. 10 is a plan view of a remote release device to be used with the first embodiment;

FIG. 11 is a plan view showing a main portion of the remote release device;

FIG. 12 is a bottom view of the main portion of the remote release device;

FIG. 13 is a right side elevational view of the remote release device;

DETAILED DESCRIPTION OF THE PREFERRED EMBODIMENT

Figure 1:
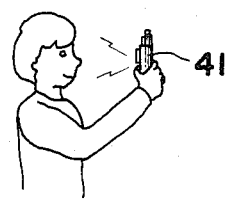
FIG. 1 illustrates how a picture of a user is taken with a camera held by the user.
Figure 2:
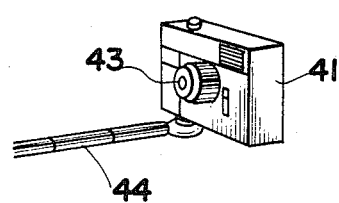
FIGS. 2 and 3 are perspective views of a supporting device according to the present invention shown coupled with a camera.
Figure 3:
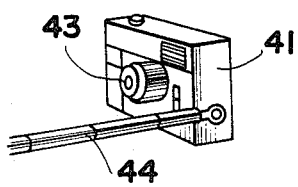

Referring now to FIGS. 2 and 3 of the drawings, the telescopic extender or supporting device 44 according to the present invention is connected to the bottom or side face of camera 41 such that supporting device 44 extends in parallel with the optical axis of objective lens 43 of camera 41.

Figure 4:
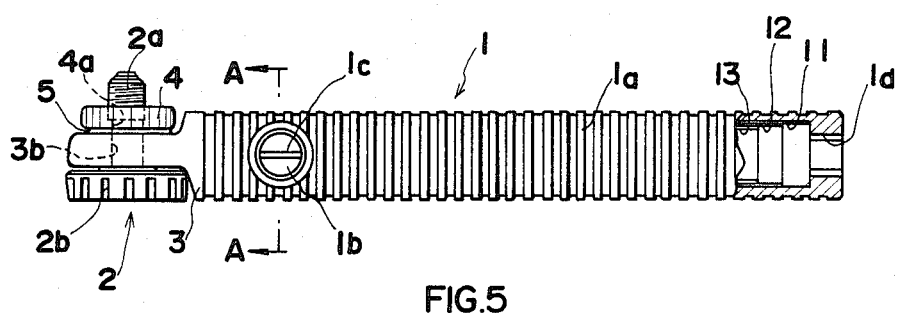
FIG. 4 is a partially cut away front elevational view of the supporting device according to the first embodiment of the present invention, the device being in an contracted state.
Figure 5:
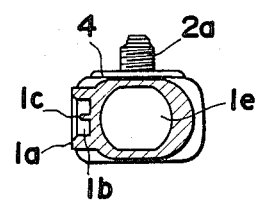
FIG. 5 is a cross sectional view taken along the line A—A in FIG. 4.

As illustrated in FIGS. 4 through 9 which show the first embodiment of the present invention, a grip or handle 1 is open at one end, is hollow, is knurled at its outer surface for preventing slipping, and is rectangular in cross section. When the supporting device according to the present invention is connected to a camera, the camera can be supported with the grip being grasped. As shown in FIG. 4, grip 1 is formed at its other end, with a tapped bore or female screw 1d to be coupled with a tripod. Grip 1 is also formed, near the open end, with a circular recess 1b for the coupling with an accessory. At the bottom of recess 1b is formed projection 1c which extends in the longitudinal direction of grip 1. Projection 1c is narrowed towards its end as shown in FIG. 5 and serves to prevent the rotation of the accessory connected to grip 1 as well as hold the accessory.

On the internal surface of grip 1 is fixed an internal hollow cylinder 11 which receives a first pipe 12 such that the latter slides relative to cylinder 11. In the same manner, second, third, fourth and fifth pipes 13, 14, 15 and 16 are telescopically inserted one into after another to relatively slide and successively overlap one another forming extendable part 10. The number of the pipes may be increased or decreased in accordance with the desired entire extended length and desired strength of extendable part 10. It should be understood that internal cylinder 11 and pipes 12, 13, 14, 15 and 16 are respectively formed with successive mutually registering longitudinally extending V-shaped grooves on their tops and bottoms, with internal cylinder 11 and pipes 12, 13, 14, 15 and 16 overlapping one another such that the V-shaped grooves overlie one another as shown in FIG. 8. The V-shaped grooves prevent internal cylinder and pipes 12, 13, 14, 15 and 16 from relatively rotating about their common longitudinal axis and facilitating the holding of the steady camera.

Of the pipes, pipe (16) inserted innermost tightly receives, as shown in FIGS. 7 and 8, connecting rod portion 3a of head member 3 by an interference fit such that head member 3 is fixed to the end of pipe 16.

Head member 3 is formed with upper and lower flat faces at the sides corresponding to the upper and lower faces of grip 1, and is also formed with a through hole 3b vertically extending through the centers of the faces. It should be noted that upper face 3c of head member 3 is slightly inclined, as shown in FIG. 9, with respect to the longitudinal direction of grip 1 and extendable part 10 such that the faces converge towards the side of connecting rod 3a. In FIG. 9, 7 denotes the direction parallel with upper plane 3c. Male screw member 2 extends through hole 3b and is provided with rotary knob 2b having a larger diameter than hole 3b and knurled on the periphery to prevent slipping, male screw 2a being engagable with the female screw formed on a camera or its accessory, and shank portion 2c connecting between rotary knob 2b and male screw 2a and having smaller diameter than male screw 2a.

Rubber ring 4 serves to prevent removal of male screw member 2 as well as to prevent slipping between head member 3 and a device attached thereon. The central bore of rubber ring 2 is formed, at its upper half, with a large diameter portion of the size to accommodate male screw 2a of male screw member 2 and, at its lower half, with a small diameter portion having a size to accommodate shank portion 2c and smaller than the diameter of male screw 2a, with shoulder 4a being formed at the boundary between the large and small diameter portions.

When male screw member 2 is assembled with head member 3, male screw 2a and shank portion 2c are at first inserted through hole 3b, washer 5 is fitted from the end of male screw 2a, and then rubber ring 4 is forcedly fitted from its smaller diameter bore portion with the elastic stretching of rubber ring 4 being utilized. After rubber ring has been completely attached, and large diameter portion of its bore receives male screw 2a while the small diameter portion receives shank portion 2c with shoulder portion 4a between the large and small diameter portion engaging the stepped portions between male screw 2a and shank portion to prevent the removal of male screw member 2.

Figure 6:
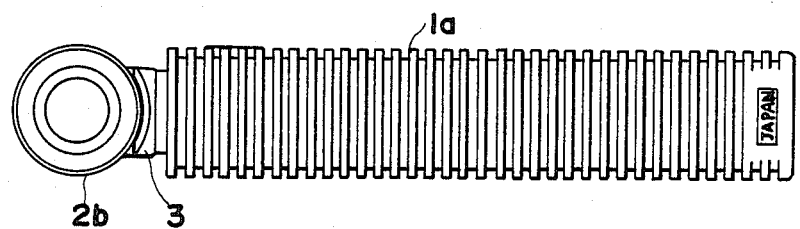
FIG. 6 is a bottom view of the first embodiment.
Figure 14:
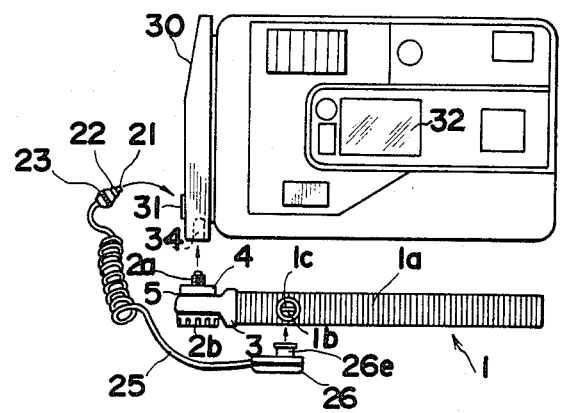
FIG. 14 is a front elevational view showing how to attach a camera to the supporting device according to the present invention.

It should be noted that the bottom surface of rotary knob 2b of male screw member 2 is substantially in alignment with the bottom face of grip 1 as shown in FIG. 4, and that the diameter of rotary knob 2b is substantially equal to the width of grip 1 as shown in FIG. 6. Additionally the outer periphery of head member 3 has substantially the same shape as the outer periphery of rotary knob 2b. Accordingly, the supporting device shown in the figures has no projecting portion and has a configuration which may be grasped or handled conveniently.

FIGS. 10 through 13 show a remote release device as an accessory to be associated with the supporting device of the present invention. In the illustrated embodiment, the camera includes a shutter actuating device which is a so-called electromagnetic release device for actuating the shutter in response to the closure of a release switch and the remote release device 20 includes an electric switch to be connected in parallel with the release switch provided in the camera. Socket 31 is provided on the camera body and is adapted to receive the end of remote release device 20. Plug pin 21 and screw portion 22 are made of electrically conductive material and insulating collar 24 interposed between them insulates them from each other. The end portion of the remote release device can be attached to release socket 31 by rotating knob 23. Plug pin 21 and screw portion 22 are respectively connected through cord 25 to normally open switch provided within area 26c in release operating portion 26 so that closure of the normally open switch will electrically initiate the operation of the camera shutter actuation device.

Release operating portion 26 includes, as shown in FIG. 11 a casing, upper half 26a, a casing, lower half 26b, the normally open switch mounted within area 26c of the casing, and a release button 26d a portion of which is exposed through an opening in casing upper half 26a such that the normally open switch provided within area 26c is closed with the exposed portion being depressed. As shown in FIGS. 11 to 13 release operating portion 26 is formed with projecting portion 26e which is adapted to be fitted in recess 1b formed on grip 1 described before. Projecting portion 26e has a cylindrical shape formed with groove 26f extending diametrically thereof in the direction parallel with the direction in which cord 25 extends. The end 26g of projecting portion 26e has a larger diameter. It should be understood that the width of release operating portion 26, i.e. the vertical dimension thereof in FIGS. 12 and 13 is substantially equal to the width of side wall 1a of grip 1.

Then, with reference to FIGS. 14 through 17 explanation will be made about how to use the supporting device of the present invention with a camera provided with a grip. Such a camera with a grip is disclosed in an U.S. patent application Ser. No. 530,143. In such type of camera, the word "camera body" or "camera housing" should sometimes be interpreted as to include a grip since the grip is fixed to a camera. The camera shown in the figures is a compact camera for use with a disk type cartridge contained film, and has a body shape that is flat and thin in the front-to-back direction with a grip being provided on its side. The grip is pivotally mounted on the side face of the camera to turn in the plane parallel to the camera side face. The grip is connected to the camera such that the grip can be stopped or retained at various angular positions relative to the camera by means of a click stop mechanism so that the camera can be held at various angular positions with the grip being grasped. A threaded hole to receive a tripped screw is formed at the bottom of the grip.

In attaching the supporting device of the present invention to the camera, rotary knob 2b is rotated so that male screw 2a of male screw member 2 is threaded into tripod screw hole 34 formed at the bottom of camera grip 30.

Then projecting portion 26e of remote release device 20 is fitted into recess 1b formed on side wall 1a of grip 1. Upon coupling, projecting portion 26e should be pressed into recess 1b such that projection 1c formed within recess 1b fits into or engages with groove 26f of projecting portion 26e. Projecting portion 26e is forced to spread out by projection 1c engaging groove 26f with its end 26g being pressed against the internal wall of recess 1b so that projecting portion 26e is held in place by the friction between end 26g and the recess internal wall.

At this time, undesirable rotation of release operating portion 26 of remote release device 20 is prevented by projection 1c formed within recess 1b of grip 1 and groove 26f formed on projecting portion 26e of the remote release device. As projection 1c is parallel to the longitudinal direction of grip 1 and groove 26f is parallel to the direction of the extension of cord 25, cord 25 is connected to extend in the longitudinal direction of grip 1.

Figure 15:
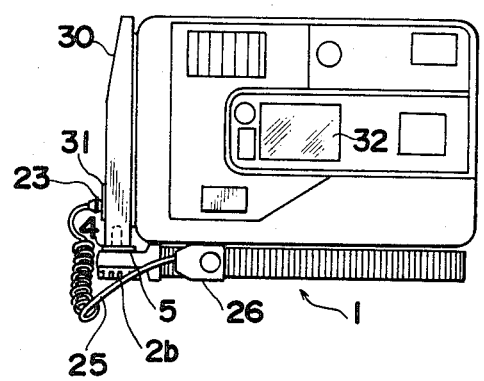
FIG. 15 is a front elevational view showing the supporting device of the present invention as coupled with a camera.
Figure 16:
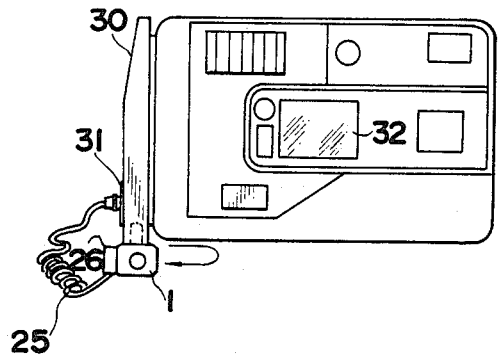
FIG. 16 illustrates the process for handling the supporting device of the present invention.

It should be noted that release operating part 26 of remote release device 20 does not project above or below grip 1 as shown in FIGS. 15 and 16 since the width of release operating part 26 is approximately equal to the height of grip 1.

Further, screw portion 22 of remote release device 20 is then threaded into release socket 31 provided on the camera, and attachment of remote release device 20 is completed. At this time, the supporting device of the present invention assumes a folded position where the device extends along the bottom of the camera as shown in FIG. 15. As the upper plane of head member 3 is inclined with respect to the axis or longitudinal direction of extendable part 10 and grip 1 as described earlier, grip 1 assumes a posture where its end opposite from the head portion, i.e. the right hand end as viewed in the drawings is slightly raised when head member 3 is connected to the bottom of camera. With the grip inclination and the elasticity of rubber ring 4, etc., the upper plane of grip 1 bears against the camera bottom plane without gap.

Accordingly, except that the height of the camera will increase a little, the supporting device can always be associated or combined with the camera without the supporting device becoming a hindrance or cumbersome when not in use or without making the camera bulky and inconvenient to carry. Thus, the camera can be put in a clothing pocket with the supporting device attached to the camera.

Figure 17A:
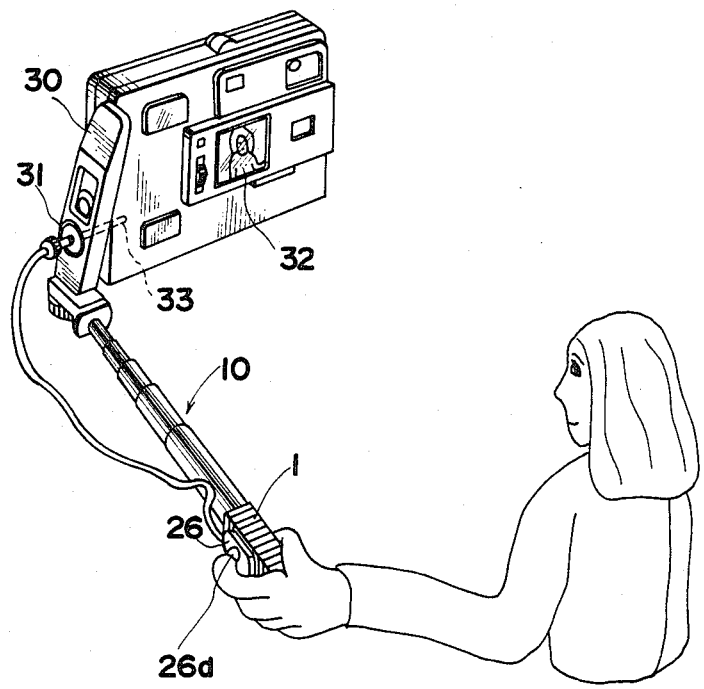
FIGS. 17(a), (b) and (c) are explanatory illustrations of the manner of using the supporting device of the present invention.

When the supporting device is used, the supporting device may be turned by 90° in the counterclockwise direction as viewed from below the camera, about male screw member 2 as shown in FIG. 16. At this time, head member 3 and washer 5, and head member 3 and rotary knob 2b slide and rotate relative to each other. Then, grip 1 may be pulled to stretch or extend extendable part 10 to the desired length and pictures may be taken with the camera directed toward the photographer. When the user wishes to take a picture of his or her face or the upper half of his or her body only, the extendable part may be extended a relatively short distance. When the user wishes to take a picture of him- or herself in a large background or with another person, the extendable part may be further extended. Then the user may support the camera directing it to him- or herself as shown in FIG. 17(a), and depress release button 26d on the release operating part of the remote release device, with the finger of the hand grasping grip 1. If the camera does not have a socket 31 to receive the release plug pin of the remote release device, pictures may be taken with a self-timer device of the camera.

Figure 17B:
Figure 17C:

With the supporting device, pictures can be easily taken with the camera angle directed upwardly from ground level or downwardly from above the photographers head as shown in FIGS. 17(b) and (c).

In the illustrated example of the manner of using the supporting device, the camera employed is provided on its side face with grip 30 rotatable about axis 31 and connected to the supporting device, and pictures can be taken with the camera being held at various angular positions if grip 30 is turned relative to the camera and extendable part 10 and grip 1 are rotated about male screw member 1. In this case, besides the pictures of the photographer, pictures can be taken with the camera supported at positions where it is not directly accessible or held by hand.

As the supporting device of the present invention is formed at one end of grip 1 with female screw 1d which may be connected to a tripod, it is possible that grip 1 may be fixed by a tripod screw or that another supporting device of the similar structure may be connected to the supporting device to increase the overall length of the support.

If the supporting device of the present invention is used with a camera such as disclosed in U.S. patent application Ser. No. 491,846 and which, as shown in FIGS. 14 through 17(a), is provided at the center of its front face, with comparatively large convex mirror 32 such that the scene to be photographed can be observed on mirror 32, framing can be easily determined since the image in mirror 32 shows whether the user is within the range to be photographed and how the background will be photographed.

Although the supporting device of the present invention is used with a flat and thin camera in the above embodiment, any type of camera may be used with it.

Additionally if the extendable part 10 is extended completely and a camera associated with the supporting device is held with the free end of the device pressed against the ground, the supporting device can be used as a simple mono-pod to prevent swinging or wobbling of the camera.

When the supporting device is not used, grip 30 should be turned to the position extending along the side of the camera, extendable part 10 should be contracted and grip 1 should be turned to the folded position extending along the bottom of the camera as shown in FIG. 15.

When the supporting device is removed from the camera, knob 23 of remote release device 20 should be rotated to remove the connecting portion of the remote release device 20 from release socket 31 and release operating part 26 should be pulled and disengaged from recess 1b of grip 1 and then rotary knob 2b of male screw member 2 should be rotated whereby the removal of the supporting device will be completed.

As remote release device 20 can be removed from the supporting device as described before, the remote release device can be used not only for photography with the supporting device of the present invention but also as a release device for the prevention of blur which would otherwise be caused by the vibration or wobbling of a camera supported on a tripod.

FIGS. 18 through 22 show other embodiments of the part of the supporting device including head member 3, rubber ring 4 and washer 5 in which the same reference characters are used for the same elements same as those of the first embodiment and explanation thereof and of the grip and extendable portion of the supporting device because they are the same as those of the first embodiment is not necessary.

Figure 18:
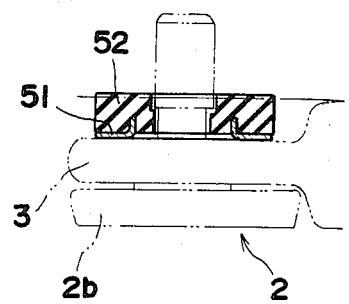
FIG. 18 is a vertical sectional view showing the second embodiment of the present invention.

FIG. 18 shows another embodiment of the head portion of the present invention wherein washer 51 has a different shape. The inner part of washer 51 is bent upward by about 90° such that the bent portions engage rubber ring 52 to make washer 51 and rubber ring 52 integral. In this embodiment, the contact portions of washer 51 and head member 3 slide relative to each other when the grip of supporting member (not shown in this Figure) is turned.

Figure 19:
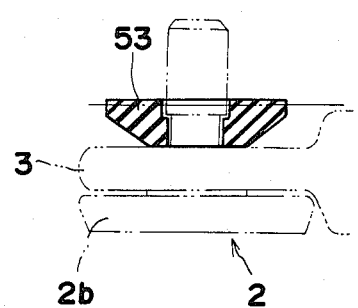
FIG. 19 is a vertical sectional view showing the third embodiment of the present invention.

FIG. 19 shows the third embodiment of the head portion of the present invention, wherein the washer is not used but rubber ring 53 has an inverted frusto-conical shape so that the area of the portion in contact with head member 3 is smaller than the area of the portion in contact with the camera associated with the supporting device. With this structure, contact portion of rubber ring 53 and head member 3 slide relative to each other when the grip of the supporting device (not shown) is turned.

Figure 20:
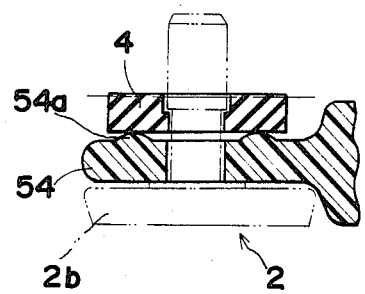
FIG. 20 is a vertical sectional view showing the fourth embodiment of the present invention.

FIG. 20 shows the fourth embodiment of the head portion of the present invention wherein no washer is used as in the case of the third embodiment but the contact areas between the rubber ring and the head portion and between the rubber ring and camera are different from each other. In this embodiment, rubber ring 4 has the same structure as that of the first embodiment. On the upper surface of head member 54 concentric circular ridge 54a is formed as viewed from above and which is in contact with rubber ring 4. In this embodiment, the area of the contact portions of rubber ring 4 and circular ridge 54a of head member 54 is small and provide a smaller resistive moment of rotation so that the ring and head member will slide and rotate relative to each other when the grip (not shown) is turned.

Figure 21:
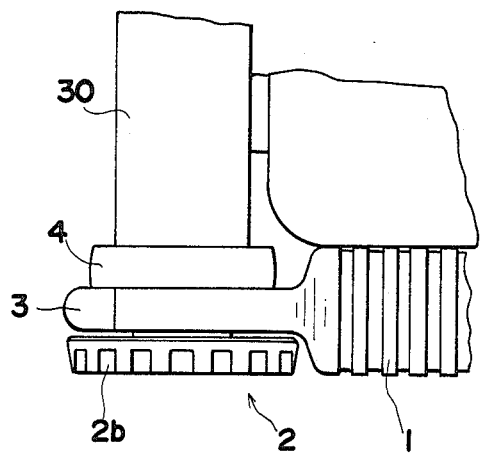
FIG. 21 is a partial front elevational view showing a supporting device of the fifth embodiment of the present invention, the device being attached to a camera.
Figure 22:
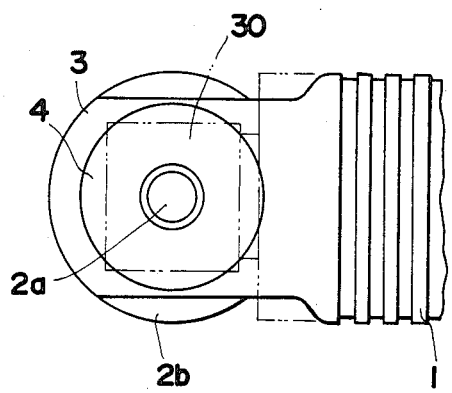
FIG. 22 is a partial plane view of the fifth embodiment.

FIGS. 21 and 22 show the fifth embodiment. This embodiment is composed of head member 3 and rubber ring 4 of the same structure as those of the first embodiment, but this washer is not used. Accordingly, when grip 1 is turned in the embodiment, the portions that relatively slide will differ in dependence on the contacting area between the camera and rubber ring 4. When the head portion is attached to the bottom of the camera grip, the contact portions of camera grip 30 and rubber ring 4 will slide relatively to each other to allow the rotation of grip 1 because the contacting area between camera grip 30 and the attaching part is smaller and shows less resistive rotational moment.

In the second through fifth embodiments of the head portion described above, the process of attaching to and removing from a camera and the manner of handling are the same as in the case of the first embodiment.

As described above, according to the present invention, the supporting device is composed of a grip or handle part having a shape of a rectangular prism that can extend along the bottom of a camera or the like; an extendable part which is extendable and can be accommodated within the grip when it is contracted; and a head member connected to the grip through the extendable part and provided with a male screw member with its rotational axis extending substantially perpendicularly to the longitudinal direction of the extendable part and grip. The supporting device can be connected to a camera body with the male screw member threaded into the tripod screw receiving threaded hole of the camera, and can extend along the bottom face of a camera body or like device with the extendable part being contracted whereby the supporting device has an advantage that it is less cumbersome and facilitates the carrying and storing of the camera or the like with the supporting device attached thereto. Moreover, the supporting device can be extended towards the front of a camera by turning it at its connecting portion with the camera, the user can support the camera at a desired distance from the user so that he or she may take a picture of him- or herself along with background scenary or other persons.

What is claimed is:

1. A telescopic extender for supporting a compact camera, comprising:
   telescopic rod means collapsible and extendable along a predetermined axis;
   a grip firmly connected to one end of said telescopic rod means in a manner not to rotate relative to said telescopic rod means, said grip being capable of housing therein said telescopic rod means when said telescopic rod means is completely collapsed;
   a head member firmly connected to the other end of said telescopic rod means in a manner not to rotate relative to said telescopic rod means;
   a screw member supported by said head member so as to be rotatable about an axis which is perpendicular to said predetermined axis, said screw member being fittable into a screw hole provided on a camera body for firmly attaching said head member to said camera body; and
   preventing means provided on said telescopic rod means for preventing said telescopic rod means from rotating relative to said grip and head member.

2. A telescopic extender for supporting a compact camera as set forth in claim 1, wherein said telescopic rod means includes a plurality of pipes the diameters of which are different from each other, and wherein said preventing means includes grooves linearly extending along said predetermined axis and projections fitted into said grooves, said grooves and projections being provided on each of said pipes.

3. A telescopic extender for supporting a compact camera as set forth in claim 2 further comprising a seat member provided on said head member so as to directly contact the camera when said head member is attached to the camera, said seat member being made of elastic material.

4. A telescopic extender for supporting a compact camera as set forth in claim 3 further comprising a washer provided between said seat member and said head member.

5. A telescopic extender for supporting a compact camera as set forth in claim 3, wherein said seat member is of substantially frusto-conical shape so that said seat member contacts said head member with an area less than the area with which said seat member contacts the camera.

6. A telescopic extender for supporting a compact camera as set forth in claim 3, wherein either one of said seat member and head member is integrally provided with an annular rib which contacts with the other one of said seat member and head member.

7. In combination with a camera including a first coupling element located on a face of the camera, a support device comprising an elongated grip member having a longitudinal bore therein, a longitudinally extendable contractable extension member including a plurality of mutually successively longitudinally slidable, relatively non-rotatably telescoping elongated extension elements, the outermost of said extension elements non-rotatably telescoping from said grip member bore, a head member rigidly affixed to the outer end of the innermost of said extension elements and a second coupling element mounted on said head member and separably engaging said first coupling element to rigidly separably couple said head member to said camera.

8. The combination of claim 7, wherein said first and second coupling elements include a threaded bore and a mating screw member.

9. The combination of claim 8, wherein said camera includes a handle member attached to and extending along a side face of said camera, said first coupling element being located at an end face of said handle member.

10. The combination of claim 9, wherein said camera is a compact camera of thin rectangular configuration and said grip member is of a maximum thickness not exceeding that of the camera and of a length not exceeding the width of said camera.

11. The combination of claim 7, wherein said extension elements have mutually successively slidably engaging ridges and grooves formed along the lengths thereof.

* * * * *